Dec. 1, 1931.   M. HARRIS   1,834,704
VEHICLE SPRING RETARDER
Filed July 10, 1925   3 Sheets-Sheet 1
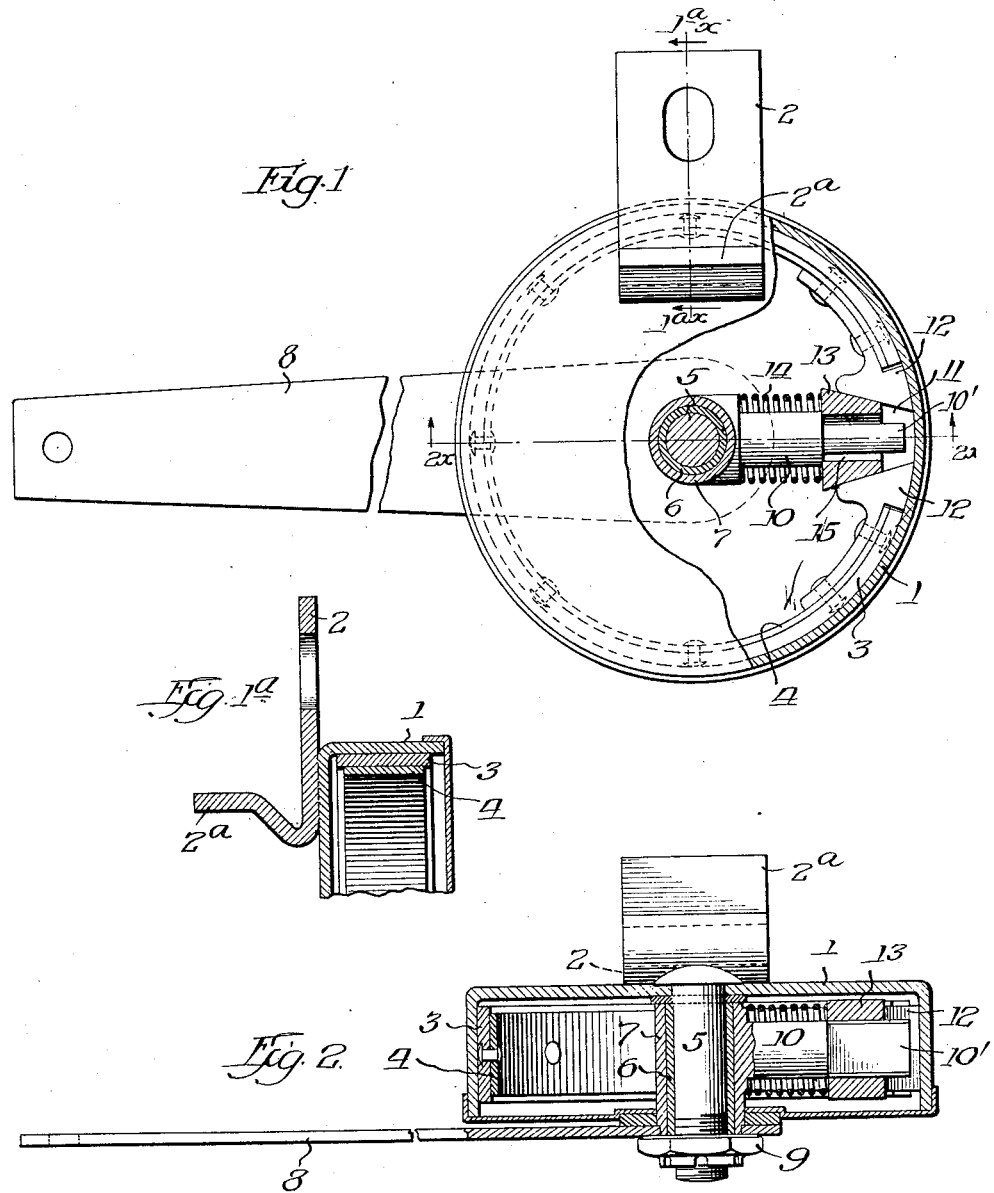

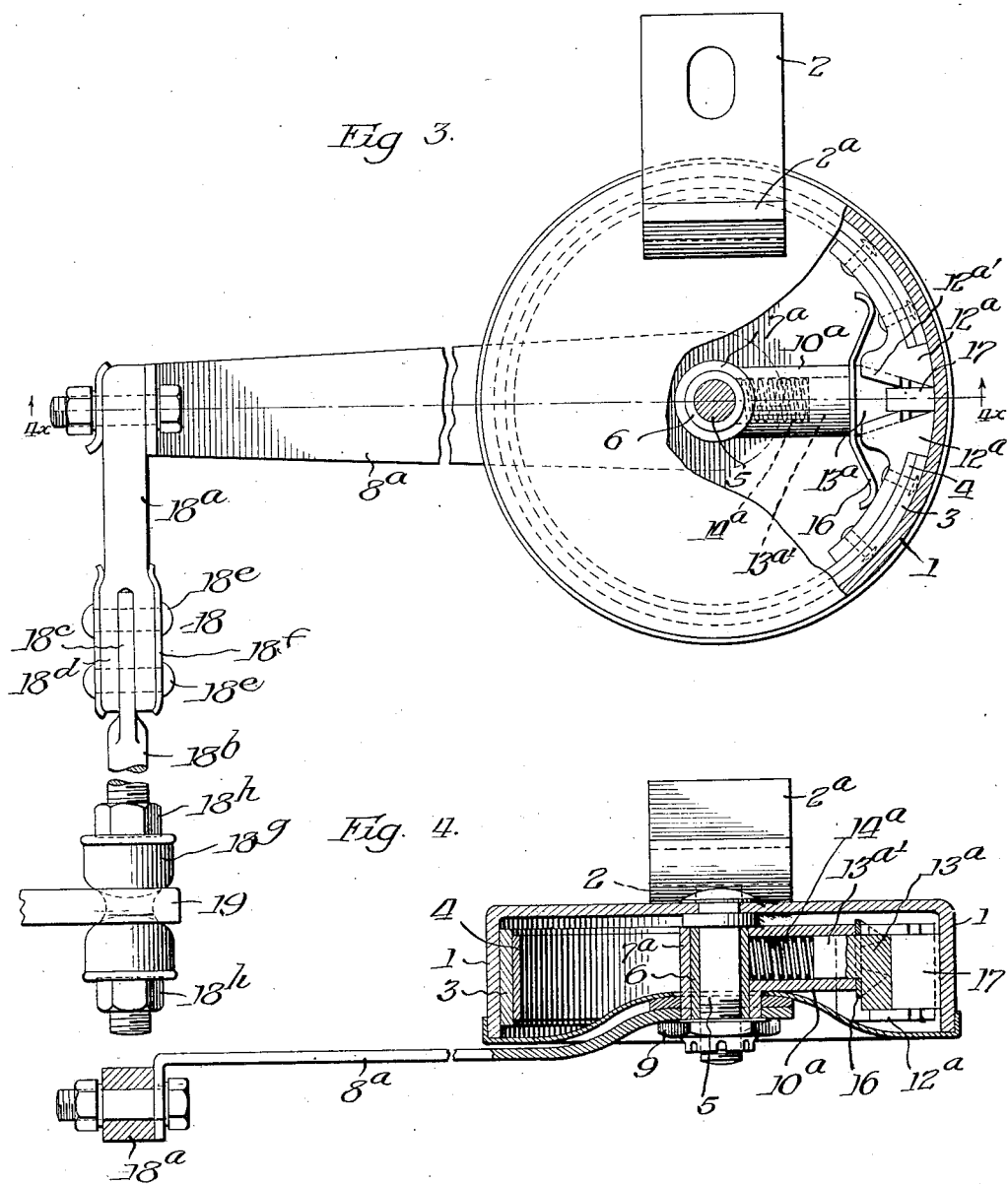

Dec. 1, 1931.   M. HARRIS   1,834,704
VEHICLE SPRING RETARDER
Filed July 10, 1925   3 Sheets-Sheet 3

Witness:

Inventor:
Mark Harris,

Patented Dec. 1, 1931

1,834,704

UNITED STATES PATENT OFFICE

MARK HARRIS, OF BIRMINGHAM, MICHIGAN, ASSIGNOR, BY MESNE ASSIGNMENTS, TO DELCO PRODUCTS CORPORATION, OF DAYTON, OHIO, A CORPORATION OF DELAWARE

VEHICLE SPRING RETARDER

Application filed July 10, 1925. Serial No. 42,664.

This invention relates to a device to be mounted upon one of two spring connected vehicle members, for instance, the body, and connected to the other of said members, for the purpose of retarding the action of the vehicle springs set up by irregularities in the surface over which the vehicle travels; and it relates particularly to vehicle spring retarders of the type in which a split brake band, sustained in frictional relation to the cylindrical surface of the brake drum, is caused to travel circumferentially within the drum in direct proportion to the vertical movements of the vehicle body.

The object of the invention is to provide a very simple, highly efficient, and durable spring retarder of the kind described, and one which will be double acting in the sense that it will resist downward movement of the body incident to compression of the springs and thereby regulate the amplitude of movement even under violent surface disturbance, as well as recoil or return movement of the body induced by reaction of the springs; and to accomplish these effects through means of a frictional brake band having a sufficient degree of flexibility to cause it to uncoil and increase its friction when moved by thrust imparted to either end of the band. Accordingly, the invention proceeds upon the principle of a mounting upon a fixed center of oscillation, preferably concentric with the brake drum, a swinging arm entering directly or indirectly into the opening of the split brake band in position to engage one end or the other of the brake band in the opposite swinging movements of the arm, so that when the band is driven circumferentially in either direction, by thrust imparted to one of its ends, the whole annulus of the band, by means of its frictional drag, will largely increase the radial pressure of the band against the drum and cause the braking effect to build up in direct proportion to the energy imparted through the arm and which it is desired to absorb. Means are provided for maintaining an initial expansion of the band against the drum, for instance, a wedge resiliently presented to the opening of the brake band. Preferably, this pressure initiating element is employed to transmit the thrust of the arm to the brake band, which in turn involves the advantageous feature of mounting the pressure initiating device, as well as its controlling spring, upon and carrying them with the arm, and the engagement of the arm with the pressure initiating device preferably involves lost motion so that the brake band will not be called into play under negligible vibrations of the springs.

According to one form of the invention, entering movement of the pressure initiating wedge, which is induced by the spring, is resisted by a perishable chock of material of substantially the same wearing capacity as the frictional face of the brake band, and traveling in contact with the same surface of the drum, so that the wedge feeds forward in its spreading relation to the brake band only as the friction element of the band wears away and enlargement of the brake band is needed. Preferably, the movements to be controlled are imparted to the swinging arm by means of a lever fulcrumed concentrically with the arm and connected through a flexible link with the axle or other vehicle member relatively to which the retarder moves when in service.

In the accompanying drawings—

Figure 1 is an elevational view of a retarder for vehicle springs showing one embodiment of the invention, a portion of the housing being broken away to disclose interior parts, and some of said parts being shown in section and others by dotted lines.

Figure 1a is a detail view showing the relation of the mounting bracket to the housing.

Figure 2 is an axial sectional view through the form of device shown in Figures 1 and 1a, the section being taken on the line 2x—2x of Figure 1.

Figure 5:
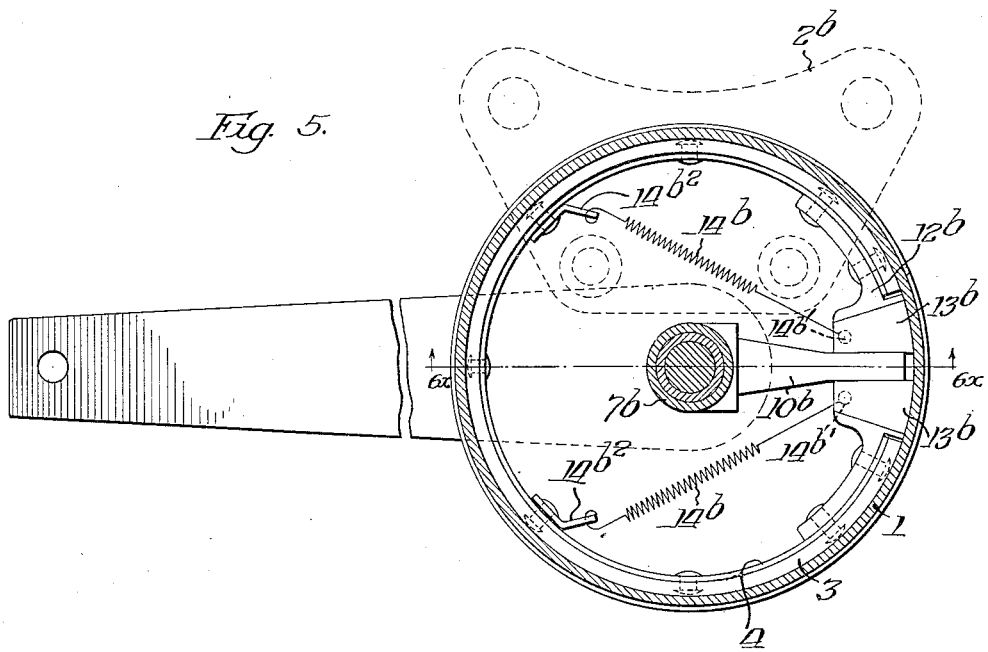
Figure 6:
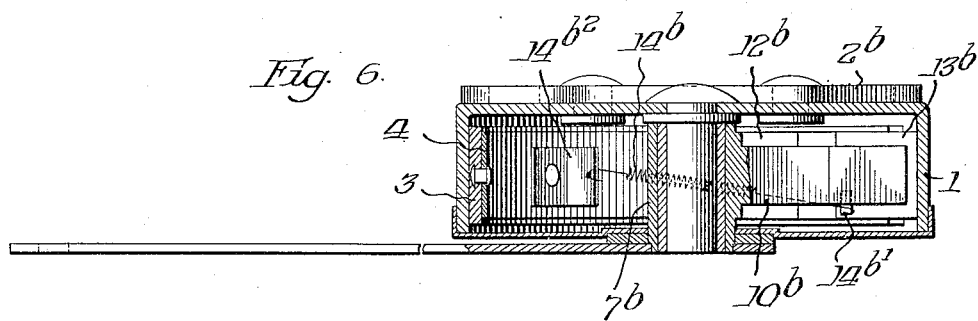

Figures 3 and 4 are views similar to Figures 1 and 2, with operating parts modified in accordance with another embodiment of the invention, and with a form of flexible rod for connecting the arm of the retarder with the vehicle part relatively to which the retarder moves; and Figures 5 and 6 are sections showing still another embodiment of the invention, taken, respectively, in a plane transverse to the axis of oscillation and in the plane of said axis.

Referring to Figures 1, 1a, and 2, 1 represents a cylindrical brake drum having a mounting bracket 2 suitably united therewith, as, for instance, by electric welding as suggested in Figure 1a; and 3 represents a brake band fitted within said drum, constructed of leather or other freely flexible material of high frictional coefficiency, and having a flexible steel strengthening or facing band 4 within it. Mounted upon a fixed pintle 5, concentric with the drum 1 and through the medium of a sleeve 6, is a hub 7 under control of a crank arm 8 which may be conveniently held upon the end of the hub by means of the nut 9. Hub 7 carries a radial arm 10 that enters the opening 11 in the brake band 3, so that when the hub 7 is rotated in either direction through means of the crank arm 8, thrust will be imparted to one end or the other of the brake band 3, and said brake band will be caused to move in frictional relation to the inner cylindrical surface of the drum 1. This movement of the brake band, being induced by a thrust against one of the ends of the band, and the band being freely flexible, will cause the band to seek to uncoil and build up its frictional bearing against the drum in proportion to the resistance which the band offers to the thrust, so that the frictional resistance developed will always be proportional to violence of movement imparted to the crank arm 8.

To better adapt the brake band to receive thrust imparted to it, it is equipped with shoes 12 at its respective ends; and in order that the band may be held under initial expansion sufficient to insure the drag and consequent building up of frictional resistance, the shoes 12 are designed with inclined faces which adapt them to receive a spreading wedge 13 normally urged by a spring 14 into the opening of the brake band which is defined by the shoes, and this wedge and spring are mounted upon the arm 10, and the wedge serves as the means through which the arm transmits its thrust. In order that minor negligible movements of the vehicle springs may not be reflected in the action of the retarder, the opening 15 of the wedge 13, and the end 10′ of arm 10 received in said opening, are of such relative transverse dimensions as to develop lost motion between the arm and the wedge in the directions of thrust.

With a device constructed as above described in connection with Figures 1 and 2, movement imparted to the outer end of the crank arm 8, for instance, that received through a connection which unites said arm with the chassis frame of a vehicle while the retarder is mounted upon the body thereof, will, when said movement is of sufficient amplitude to be undesirable, impart thrust in one direction or the other to the braking element 3, 4, and impose frictional resistance to the relative movement between the body and its chassis; and, by reason of the use of thrust in imparting this movement and the flexible nature of the braking element, this frictional resistance will be automatically proportioned to the violence of the action which is being resisted. It is to be noted that the resistance aforesaid will develop during the downward movement of the vehicle body and compression of the springs incident thereto, thereby relieving the springs of the violent effect of major road imperfections, as well as in the upward movement of the body or recoil action of the springs, with the result of retarding and limiting the amplitude of recoil with the disagreeable consequences thereof.

According to Figures 3 and 4, the retarder may consist of the same cylindrical drum 1 with attaching bracket 2 and containing braking element 3, 4, fixed pintle 5 with sleeve 6, and hub 7a; but the hub is equipped with a crank arm 8a and radial arm 10a for controlling the braking element; and the spreading wedge 13a works within a hollow bore of the arm 10a and is under control of a spring 14a within said bore. The arm 10a also carries a yoke-shaped spring 16 held in place by the shank 13a′ of the wedge 13a which passes through said spring and functioning to hold the ends of the braking element outward into initial frictional contact with the inner cylindrical surface of the drum. Moreover, the shoes 12a are constructed with confining lips 12a′ which overlap the wedge 13a and a chock 17, preferably of the same material as that of the friction band 3, is interposed between the wedge 13a and a friction surface of the drum, and travels on said surface commensurately with the travel of the friction band, with the result that while the chock resists outward movement of the wedge under the influence of spring 14a, said chock will wear away as the brake band wears away and graduate the intrusion of the wedge into the brake band opening just sufficiently to expand the braking element in compensation for the wearing away of the band 3.

As further suggested in Figures 3 and 4, a spring retarder constructed as described and mounted on one of two spring connected vehicle members, for instance, the body of the vehicle, may have its crank arm 8a, through which movement is imparted to the retarder, connected through means of a special coupler 18 to the other vehicle member, for instance, a part 19 of the chassis frame or some element connected with the chassis frame; and this coupler may embody in its construction a member 18a of leather, rubber vulcanized on fabric, or other readily flexible material combining transverse flexibility with sufficient rigidity to transmit loads both by tension and compression; also the rod 18b having a reduced end 18c clamped in the bifurcated portion 18d of the member 18a by means of bolts 18e and clamping plates 18f; said rod 18b having a universal joint knuckle 18g composed of resilient material, such as rubber, located thereon by means of nuts 18h, and said knuckle fitting in concave seats formed in the part 19.

According to Figures 5 and 6, the drum 1, having attaching bracket 2b and containing brake element 3, 4, has a radial thrust arm 10b on a hub 7b, entered between a pair of wedges 13b arranged in thrusting relation to the shoes 12b of the brake element with an effect substantially as already described in connection with Figures 1 to 4; but the inclined faces of the shoes 12b and the wedges 13b are so arranged that the wedges operate radially inward instead of radially outward in developing initial spread of the brake band; and these wedges are urged to their duty by means of tension springs 14b connected with the wedges at 14b′ and with the braking element at points remote from its ends through means of attaching clips 14b2, thus producing another embodiment of the operative principle of having the radial thrust arm oscillating upon a fixed pintle and imparting thrust in opposite directions to the end of the braking element through means of wedges which are held to duty by resilient means partaking of the braking movements.

Important features of the present invention are the fact that the swinging arm is adapted to enter into abutment with either end of the split ring and move the entire ring by thrust against either end as distinguished from traction thereon, while leaving the other end and intermediate portion of the ring free to develop a counter force to such movement by their friction with the drum; the counter force being in such direction that it causes the ring to expand and thus build up the resistance to a greater or less degree according to the velocity of movement imparted to the ring; also the fact that the ring may be rotated to any point relatively to the drum and, from said point as an initial position, function in the manner intended; for which reason the retarder functions precisely the same regardless of the normal degree of compression or position of rest assumed by the spring under the load which the vehicle carries.

I claim:

1. In a vehicle spring retarder, a drum, a braking member in said drum comprising an approximately complete highly flexible inherently resilient annulus having a single split therein, and a radial arm swinging in said drum, movable into abutment against either end of said annulus at will to impart opposite swinging movements thereto by thrust while leaving the other end and intermediate parts thereof free to frictionally oppose such thrust; there being means acting radially moving with said arm for initially spreading said band.

2. In a vehicle spring retarder, a drum, a braking member in said drum comprising an approximately complete highly flexible inherently resilient annulus having a single split therein, and a radial arm swinging in said drum, movable into abutment against either end of said annulus at will to impart opposite swinging movements thereto by thrust while leaving the other end and intermediate parts thereof free to frictionally oppose such thrust; there being means acting radially moving with said arm for initially spreading said band; the last-named means comprising a wedge, and means for constantly urging it into the split of the brake band.

3. In a vehicle spring retarder, a drum, a braking member in said drum comprising an approximately complete highly flexible inherently resilient annulus having a single split therein, and a radial arm swinging in said drum, movable into abutment against either end of said annulus at will and impart opposite swinging movements thereto by thrust while leaving the other end and intermediate parts thereof free to frictionally oppose such thrust; there being means acting radially moving with said arm for initially spreading said band; the last-named means comprising a wedge, and means for constantly urging it into the split of the brake band; and said arm imparting thrust to the end of the brake band through the medium of said wedge.

4. In a vehicle spring retarder, a drum, a braking member in said drum comprising an approximately complete highly flexible inherently resilient annulus having a single split therein, and a radial arm swinging in said drum, movable into abutment against either end of said annulus at will and impart opposite swinging movements thereto by thrust while leaving the other end and intermediate parts thereof free to frictionally oppose such thrust; there being means acting radially moving with said arm for initially spreading said band; the last-named means comprising a wedge, and means carried by the arm for constantly urging it into the split of the brake band.

5. In a spring retarder, a friction drum, a flexible friction member coacting with said drum and comprising an approximately complete split annulus having upon its ends thrust-receiving shoes with inclined faces, radially acting wedging means entering between the shoes and initially expanding the friction member means for constantly urging said wedging means in a direction to take up wear, and a radially disposed arm engaging said wedging means and imparting thrust to the friction member in opposite directions at will.

6. In a spring retarder, a friction drum, a split ring cooperating therewith, a wedge between the ends of and normally holding said ring in expanded condition, a swinging arm engaging said wedge and through it imparting thrust to either end of the ring at will, and a spring carried by said arm and urging said wedge in between said ends.

7. In a spring retarder, a friction drum, a split ring within said drum, a swinging arm adapted to impart thrust to either end of said ring, and a spring carried by said arm and in bearing against the ends of the band, in the direction to press them against the drum.

8. In a spring retarder, relatively rotatable frictionally controlled members, a crank arm for imparting rotation to a member, a connecting rod for said crank arm, a double knuckle on said rod, and a receiving member having a double concave seat for said knuckle.

9. In a spring retarder, relatively rotatable frictionally controlled members, a crank arm for one of said members, and a connection for said crank arm, comprising a section of flexible material, a rod joined to said section, a double ball knuckle on said rod, and a double socketed part in which said knuckle seats.

10. In a spring retarder, a member carrying a substantially cylindrical friction surface, an expansible split braking ring in frictional contact with said surface, a wedge member inserted between the ends of said braking ring and adapted to move said braking ring circumferentially in either direction by a thrust upon its appropriate end while leaving the other end free, and a rotatable member in said cylindrical member having means providing lost motion for connecting said rotatable member to said wedge.

11. In a shock absorber of the character described, a member having a substantially cylindrical surface, an expansible split brake band having inherent expanding resilience in contact with said surface, and bearing on said surface throughout the circumference by virtue of its inherent expanding resilience, and a rotatable actuator having means intruded into the split of the brake band adapted to move the brake band circumferentially in either direction by a thrust upon its appropriate end, said band upon being moved in either direction, expanding due to its contact with the cylindrical surface of said member, whereby a resistance to movement and braking action is automatically created commensurate with the shock to be absorbed.

12. In a shock absorber of the character described, a member having a substantially cylindrical surface, an expansible split brake band having inherent expanding resilience in contact with said surface, and bearing on said surface throughout the circumference by virtue of its inherent expanding resilience, and a rotatable actuator having means intruded into the split of the brake band for initially expanding said brake band into more intimate contact with said surface and adapted to move the brake band circumferentially in either direction by a thrust upon its appropriate end, said band upon being moved in either direction, expanding due to its contact with the cylindrical surface of said member, whereby a progressively increasing resistance to movement and braking action is automatically created commensurate with the shock to be absorbed.

Signed at Detroit, Michigan, this 27th day of June, 1925.

MARK HARRIS.